Dec. 12, 1967   J. J. HOFFMAN ET AL   3,357,088
METHOD OF ATTACHING A HANGER TO AN
ELONGATED FLEXIBLE TUBE WALL
Original Filed Oct. 2, 1964
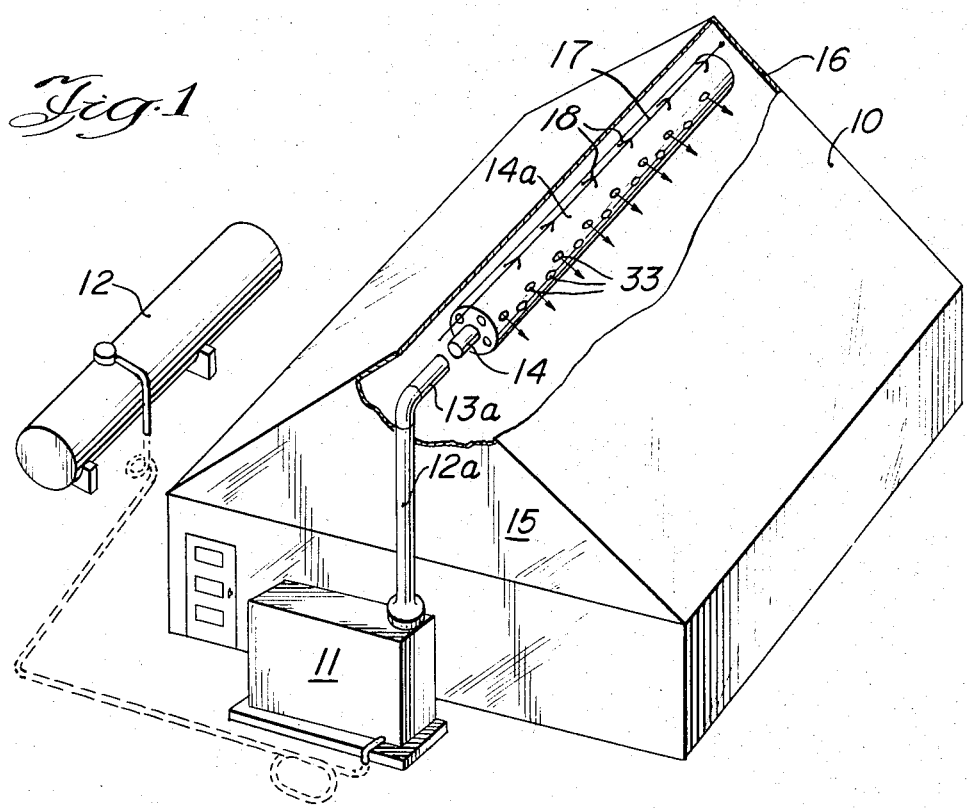
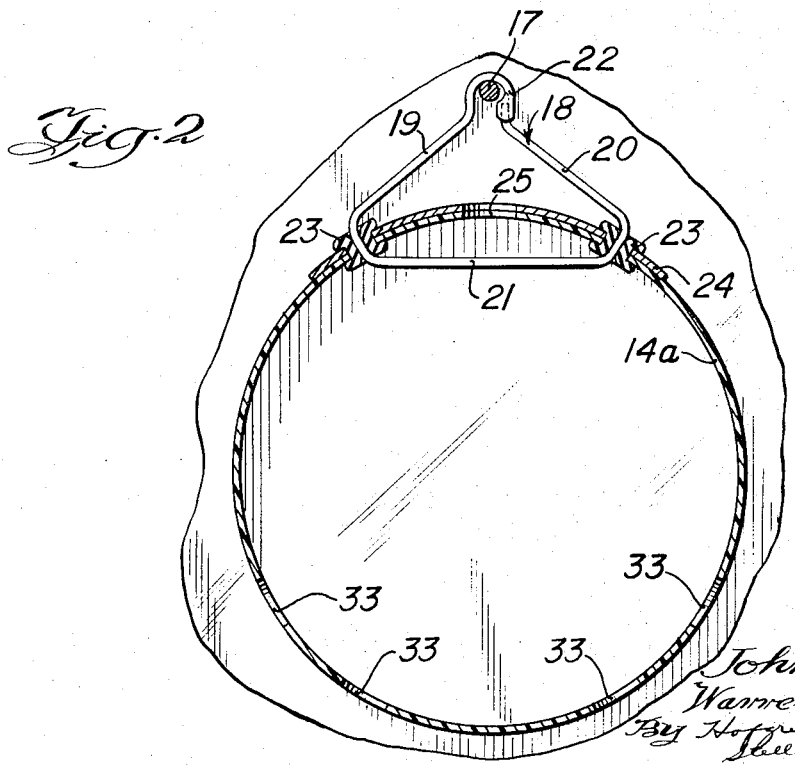
INVENTORS
John J. Hoffman
Warren R. Hafstrom
By Hofgren, Wegner, Allen,
Stellman & McCord
ATTORNEYS.

Dec. 12, 1967    J. J. HOFFMAN ETAL    3,357,088
METHOD OF ATTACHING A HANGER TO AN
ELONGATED FLEXIBLE TUBE WALL
Original Filed Oct. 2, 1964    2 Sheets-Sheet 2
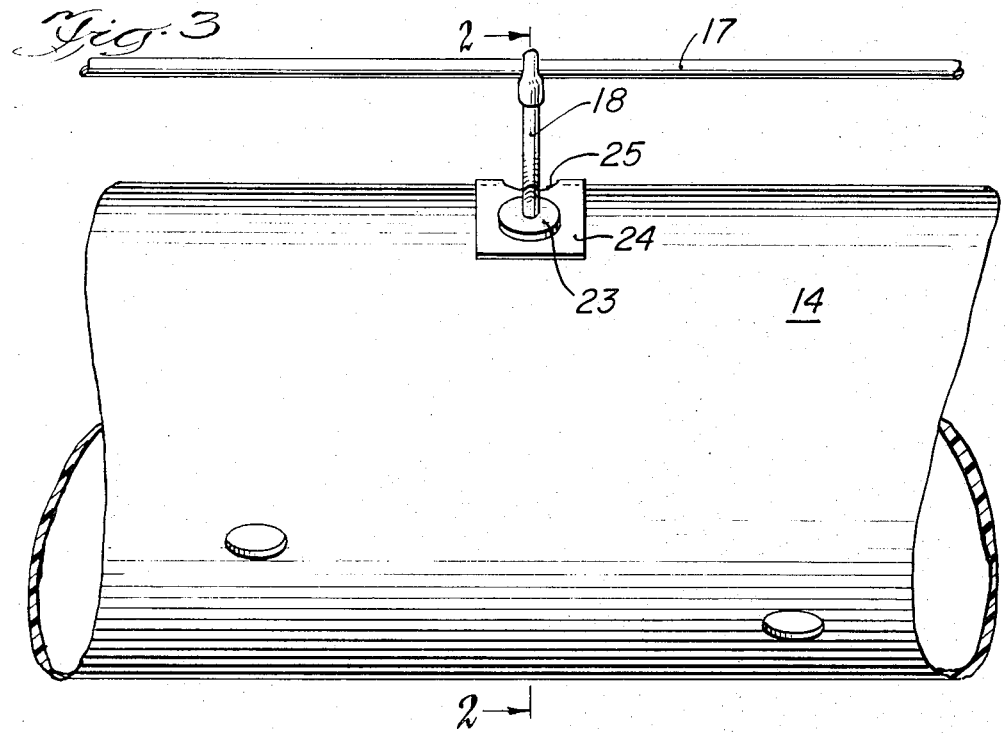
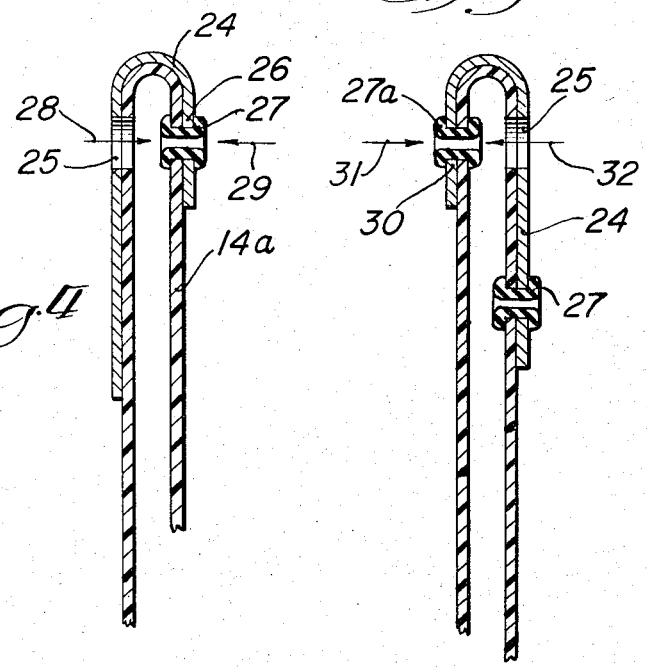

United States Patent Office 3,357,088
Patented Dec. 12, 1967

3,357,088
METHOD OF ATTACHING A HANGER TO AN ELONGATED FLEXIBLE TUBE WALL
John J. Hoffman, South Bend, Ind., and Warren R. Hafstrom, Stevensville, Mich., assignors to Whirlpool Corporation, a corporation of Delaware
Original application Oct. 2, 1964, Ser. No. 401,149. Divided and this application Aug. 26, 1966, Ser. No. 577,570
1 Claim. (Cl. 29—432)

ABSTRACT OF THE DISCLOSURE

A method of attaching a hanger to an elongated flexible duct of closed circumference in which an opening is cut in the duct, the duct is bent to align a portion of the duct with the opening, a perforating grommet is attached to this aligned portion, then the duct is bent to align another portion of the duct with this opening and another grommet is attached in the same manner to the other portion and finally the hanger is attached in the thusly formed opening.

---

This invention relates to a method of attaching a hanger to an elongated flexible tube wall, and this application is a division of our copending application Ser. No. 401,149, filed Oct. 2, 1964, now abandoned.

Flexible tubes have been used for conducting fluids for various purposes. One such purpose has been to direct circulating gases such as heated air, carbon dioxide rich air and the like within greenhouses. A major difficulty has been in providing a proper suspension system for such flexible tubes.

One of the features of this invention is to provide an improved method for attaching a hanger, such as each of a plurality of spaced hangers, to an elongated flexible tube wall of closed circumference and substantial length.

Other features and advantages of the invention will be apparent from the following description of one embodiment thereof taken in conjunction with the accompanying drawings. Of the drawings:

FIGURE 1 is a perspective view of a typical greenhouse enclosure including an atmosphere distributing apparatus with the enclosure being broken away for clarity of illustration.

FIGURE 2 is a vertical sectional view taken substantially along line 2—2 of FIGURE 3.

FIGURE 3 is a fragmentary, side elevational view of the flexible atmosphere distributing duct means and supporting apparatus.

FIGURE 4 is a sectional view through a portion of the flexible duct means illustrating one step in the method of this invention for attaching the supporting apparatus to the duct.

FIGURE 5 is a view similar to FIGURE 4 illustrating another step in the attaching of the supporting apparatus.

The atmosphere distributing apparatus illustrated in the drawings is located in a typical greenhouse 10 which is supplied with a growth promoting atmosphere, such as one rich in carbon dioxide, from a generator 11 which operates by burning a hydrocarbon fuel from a source illustrated at 12. Such an apparatus for producing a carbon dioxide rich atmosphere is disclosed in the copending Bose et al. application Ser. No. 382,148, filed July 13, 1964, and assigned to the same assignee as the present application.

The products of combustion from the generator 11 which constitute the growth promoting atmosphere, as they are rich in carbon dioxide, are directed through a pipe 12 having a horizontal portion 13 extending into the greenhouse 10. The pipe 12a–13a exhausts into the greenhouse 10 adjacent the inlet of a motor operated blower 14 positioned at one end of a flexible duct 14a, here shown as extending from one end 15 to the opposite end 16 of the greenhouse, and containing spaced openings 33. A typical blower installation is disclosed in greater detail in the copending Tibbitts et al. application Ser. No. 401,147, filed Oct. 2, 1964, now abandoned, also assigned to the same assignee as the present application.

The flexible duct 14a is preferably made of a flexible plastic such as polyethylene or polypropylene and is provided with spaced openings 33, as shown in FIGURES 1 and 2, for fluid flow as indicated by the arrows in FIGURE 1. The duct 14a is removably suspended from a wire 17 by spaced spring wire clips 18 which can be either of a generally isosceles triangle shape with the two equal sides 19 and 20 located exteriorly of the duct 14a and the base side 21 located within the duct 14a or of an equilateral triangle shape, or any similar shape desired. The apex of the clip 18 where the two sides 19 and 20 join is shaped to form a catch 22 which holds the upper end of the spring side 20. Each clip extends through spaced openings, as illustrated in FIGURE 2, in the duct 14a with these openings being provided with ordinary metal grommets 23. The grommets extend through a reinforced portion of the duct 14a with this reinforcement being provided by an adhered strip 24 of plastic material on the outer surface of the duct, so that the grommets 23 extend through both the duct and the reinforcing plastic strip. With this arrangement the flexible duct 14a is suspended from spaced areas along its length from the wire 16 so that the entire installation is extremely lightweight and places no severe strain on the ordinary lightweight structure of a conventional greenhouse.

FIGURES 4 and 5 illustrate the installation of the hanger clips on the duct 14a. Because the duct is of considerable length and of relatively small diameter, it would be very laborious to attempt to install the hangers from either end. Because of this, the method of this invention is used to install the hanger clips 18.

As shown in FIGURES 4 and 5, the duct 14a and reinforcing strip 24 are provided with a cutout opening 25 located at the top of the duct, as shown in FIGURE 2, and as illustrated about midway of the ends of the reinforcing strip 24. A portion 26 of the duct and reinforcing strip that is spaced from the opening 25 is then aligned with the opening, as shown in FIGURE 4. A metal grommet 27 is then fastened in this portion 26 with a customary tool by applying force to one end through the opening 25, as indicated by the arrow 28 of FIGURE 4, and simultaneously to the other side of the grommet which is of course on the exterior of the duct 14a, as indicated by the arrow 29.

As soon as this one grommet has been installed in this manner, the opening 25 is then similarly aligned with a second portion 30 of the duct 14a and reinforcing strip 24 and a second grommet 27a is similarly applied as by force applied as indicated by the arrows 31 and 32.

As can be seen from the above description, the spaced hangers of this invention provide secure yet lightweight means for installing the duct in an enclosure such as a greenhouse or the like. Furthermore, these hangers can be installed rapidly and efficiently, even where the duct is of small diameter and considerable length.

Having described our invention as related to the embodiment shown in the accompanying drawings, it is our intention that the invention be not limited by any of the details of description, unless otherwise specified, but rather be construed broadly within its spirit and scope as set out in the accompanying claims.

The embodiment of the invention in which an exclusive property or privilege is claimed is defined as follows:

The method of attaching a hanger to an elongated flexible duct of closed circumference having a reinforcing strip therewith, comprising: cutting an opening in the duct and reinforcing strip, then bending the duct and reinforcing strip substantially 180° into U-shape to align a portion of said duct and reinforcing strip with said opening, then attaching a perforating grommet to said portion by applying force to an end of a tool through said opening and simultaneously to the other side of the grommet on the exterior of the grommet, then bending the duct and reinforcing strip to align another portion of the duct and reinforcing strip with said opening, then attaching another grommet to said other duct and reinforcing strip edge portion in the same manner, and attaching said hanger in said openings.

References Cited

UNITED STATES PATENTS

| | | | |
|---|---|---|---|
| 1,833,704 | 11/1931 | Bins | 138—107 |
| 1,846,368 | 2/1932 | Smith | 29—470.5 |
| 2,857,108 | 10/1958 | Wallace | 237—53 |

THOMAS H. EAGER, *Primary Examiner.*